122,524

UNITED STATES PATENT OFFICE.

JAMES J. JOHNSTON, OF ALLEGHENY, ASSIGNOR, BY MESNE ASSIGNMENTS, TO HIMSELF AND ALEXANDER POSTLEY, OF PITTSBURG, PENN.

IMPROVEMENT IN THE MANUFACTURE OF IRON.

Specification forming part of Letters Patent No. 122,524, dated January 9, 1872.

*To all whom it may concern:*

Be it known that I, JAMES J. JOHNSTON, of the city and county of Allegheny, in the State of Pennsylvania, have invented a new and useful Improvement in Manufacturing Iron; and I do hereby declare that the following is a full, clear, and exact description thereof.

The nature of my invention consists in mixing with melted "pig-iron," or melted iron direct from the ore, a metallic oxide, or a metallic oxide combined with other ingredients, so as to form one thoroughly mixed mass of fine particles, and then mix the same with melted cast-iron for the purpose of making "ingots," to be used in the manufacture of steel, or for making "blooms," to be manufactured into wrought-iron or "malleable iron."

To enable others skilled in the arts to make and use my invention, I will proceed to describe the method of preparing and mixing the metallic oxide, or the metallic oxide combined with other ingredients, with the melted cast-iron, usually called "pig-iron."

I take a good article of iron ore and pulverize it so as to reduce it to a powdered condition, and heated to about 600° Fahrenheit; I then mix from ten to thirty pounds of this pulverized ore, in its heated state, with about one hundred pounds of melted cast-iron. The pulverized iron ore and melted cast-iron are mixed together in a "ladle" or "shank," sometimes called a "bull-ladle;" the "ladle" or "shank" may be made of any desired form and size, and should be coated or "daubed" with a pasty matter, consisting of pulverized ore and loam mixed together with water or other liquid matter; after the "ladle" or "shank" has been coated or "daubed" it should be thoroughly dried before the melted cast-iron is run or poured into it. After the melted cast-iron is run or poured into the "ladle" or "shank" the pulverized iron ore is then poured on the melted cast-iron in a steady stream, taking care to so stir the melted cast-iron as to impart to it a rapid whirling motion, which stirring may be done and the whirling motion given to the melted cast-iron by means of a bar of iron coated with the material used for coating the "ladle" or "shank," care being taken to have the coating on the iron bar thoroughly dried before using it in the melted cast-iron. After the melted cast-iron and pulverized iron ore have been mixed together in the manner hereinbefore described, and the mixed mass has become sufficiently congealed, the "ladle" or "shank" is inverted and the mixed mass will drop out, after which the "ladle" or "shank" is again coated or "daubed" and dried for the purpose of mixing another mass of melted cast-iron and pulverized iron ore. The mixed and congealed mass of melted cast-iron and pulverized iron ore, after being exposed to the action of the atmosphere and has become cold, is then placed in an ordinary heating furnace and kept at a red heat (cherry red) for several hours, after which the mass is heated to what is termed a "welding heat;" it is then removed from the furnace and worked and manipulated in any of the known methods of making it into any of the known forms of merchantable iron or steel; or the mixed and congealed mass may be worked in the ordinary puddling-furnace, similar to working of "plate-iron," and then hammered or rolled into merchants' bar-iron.

Pulverized iron ore, red oxide of lead, black oxide of manganese, and other ingredients, may be mixed and compounded together and then mixed into melted cast-iron and a good result be obtained; therefore, I wish it clearly understood that I do not confine myself to the use of a single oxide for mixing with melted cast-iron for the purpose hereinbefore set forth.

I also wish it clearly understood that I am aware that oxides have been used as "physic" or "flux" in the puddling process, for making puddled balls in the manufacture of iron; therefore, I wish it clearly understood that I do not claim, broadly, the use of an oxide or oxides in the manufacture of iron or steel; but What I do claim as of my invention is—

1. Mixing pulverized iron ore, or other metallic oxide, with melted cast-iron, substantially as hereinbefore described, and for the purpose set forth.

2. Forming "ingots" for the manufacture of steel, and "blooms" for the manufacture of wrought or malleable iron, by mixing pulverized iron ore, or other metallic oxides, with melted cast-iron, substantially as hereinbefore described.

JAMES J. JOHNSTON.

Witnesses:
GEO. H. THOMAS,
L. C. THOMAS.

(85)